United States Patent

Nakao et al.

Patent Number: 5,356,996
Date of Patent: Oct. 18, 1994

[54] COATING COMPOSITION

[75] Inventors: Yasushi Nakao, Hiratsuka; Junshi Adachi, Tokyo; Motoshi Yabuta, Hadano, all of Japan

[73] Assignee: Kansai Paint Company, Limited, Amagasaki, Japan

[21] Appl. No.: 199,022

[22] Filed: Feb. 18, 1994

[30] Foreign Application Priority Data

Feb. 22, 1993 [JP] Japan .................. 5-057694

[51] Int. Cl.$^5$ ............ C08L 61/28; C08L 83/04
[52] U.S. Cl. ................... 525/158; 525/163; 525/518; 525/519
[58] Field of Search ............ 525/158, 163, 518, 519

[56] References Cited

U.S. PATENT DOCUMENTS 4,499,151  2/1985  Dowbenko et al. .............. 428/447

*Primary Examiner*—James J. Seidleck
*Assistant Examiner*—W. Robinson H. Clark
*Attorney, Agent, or Firm*—Armstrong, Westerman, Hattori, McLeland & Naughton

[57] ABSTRACT

Disclosed is a coating composition including: (a) an acrylic polymer prepared by copolymerizing about 2.5 to about 30% by weight of an alkoxysilane-containing vinyl monomer which is represented by the formula

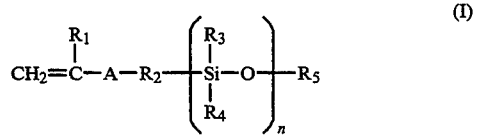

wherein A is

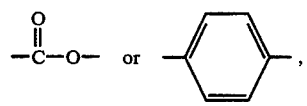

$R_1$ is a hydrogen atom or a methyl group, $R_2$ is a bivalent aliphatic saturated hydrocarbon group having 1 to 6 carbon atoms, $R_3$ and $R_4$ are the same or different and are each a phenyl group, an alkyl group having 1 to 6 carbon atoms or an alkoxy group having 1 to 10 carbon atoms, $R_5$ is an alkyl group having 1 to 10 carbon atoms, and n is an integer of 1 to 100, about 5 to about 50% by weight of an acetoacetoxy-containing vinyl monomer and about 20 to about 92.5% by weight of a vinyl monomer which is copolymerizable with the above vinyl monomers, and (b) an amino resin in an amount of about 5 to about 50% by weight based on the total amount of resin solids in the coating composition.

4 Claims, No Drawings

COATING COMPOSITION

The present invention relates to a novel coating composition which is capable of forming a coating excellent in the resistance to acids, weather and staining, etc.

Automotive top coating compositions comprising a hydroxyl-containing acrylic resin and an amino resin as main components are in predominant use. The coating of said top coating composition, although excellent in the appearance, weatherability, physical properties, etc., has the drawback that the properties of the coating surface are readily impaired due to acid rain (pH 4 or less), which has recently posed a social problem. This deficiency occurs because an ether linkage formed by a crosslinking reaction between the alkoxymethyl group of the amino resin and the hydroxyl group of the acrylic resin is susceptible to attack of acid rain and is liable to hydrolyze under the attack. To obviate this problem, various crosslinking components exclusive of an amino resin have been investigated. However, the proposed crosslinking components have presented serious problems when employed for automotive top coating compositions and have not been used for practical purposes or example, an acid-epoxy crosslinking component is not satisfactorily curable and is poor in the resistance to solvents and scratch. An isocyanate crosslinking component can not provide a single-package coating composition and is toxic. A blocked isocyanate crosslinking component is not suitably curable and is inferior in the resistance to solvents and scratch. An alkoxysilane moisture-curing component is low in the storage stability. These shortcomings arise mostly from the absence of an amino resin.

In this situation, research efforts are now directed to acid-resistant amino resin crosslinking components, for example, to an acrylic resin crosslinking component containing an acetoacetoxy group in lieu of a hydroxyl group. The research gave the following findings. Due to a C—C bond formed by the crosslinking between an acetoacetoxy-containing acrylic resin and an amino resin, the obtained coating film exhibits a far higher acid resistance than due to the ether linkage produced by the crosslinking of a hydroxyl-containing resin and an amino resin. It was also discovered that high resistance to weather and scratch which is characteristic of amino resin crosslinking components is imparted. In this case, because the amino resin is used as a crosslinking agent, the resulting coating has a relatively high affinity for acids owing to its low basicity, thereby failing to show a satisfactorily high acid resistance.

On the other hand, a technique has been proposed to improve the acid resistance while retaining the superior properties of amino resin crosslinking components. This technique makes use of a combination of a highly acid-resistant crosslinking component (e.g., acid-epoxy, or alkoxysilane, or blocked polyisocyanate crosslinking component) and an amino resin crosslinking component. According to the proposed technique, the highly acid-resistant crosslinking component prevents entry of acid rain into the coating film while the amino resin crosslinking component, because of its high curability, provides the coating film with high resistance to weather, solvents and scratch. However, the obtained coating film still remains unsatisfactory in the acid resistance due to the presence of the ether linkage in the crosslinked portion produced by a crosslinking reaction between the hydroxyl-containing resin and the amino resin.

An object of the present invention is to provide a novel coating composition which is free of the foregoing drawbacks of the prior art.

Another object of the invention is to provide a novel coating composition which is curable at a low temperature and capable of forming a coating film having improved resistance to acids, weather, water, staining, solvents and scratch and so on.

These and other objects of the invention will become more apparent from the following description.

According to the invention, there is provided a coating composition comprising: (a) an acrylic polymer prepared by copolymerizing about 2.5 to about 30% by weight of an alkoxysilane-containing vinyl monomer which is represented by the formula

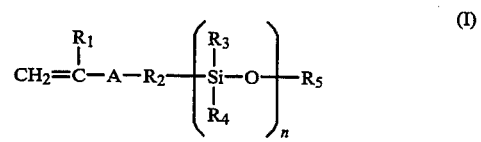

wherein A is

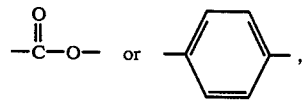

$R_1$ is a hydrogen atom or a methyl group, $R_2$ is a bivalent aliphatic saturated hydrocarbon group having 1 to 6 carbon atoms, $R_3$ and $R_4$ are the same or different and are each a phenyl group, an alkyl group having 1 to 6 carbon atoms or an alkoxy group having 1 to 10 carbon atoms, $R_5$ is an alkyl group having 1 to 10 carbon atoms, and n is an integer of 1 to 100, about 5 to about 50% by weight of an acetoacetoxy-containing vinyl monomer and about 20 to about 92.5% by weight of a vinyl monomer which is copolymerizable with the above vinyl monomers, and (b) an amino resin in an amount of about 5 to about 50% by weight based on the total amount of resin solids in the coating composition.

The present inventors' research has revealed the following. Since the coating composition comprising the above-specified acrylic polymer and the amino resin as the main components accomplishes the main crosslinking reaction between the acetoacetoxy group and the amino resin, the C—C bond formed in the crosslinked portion essentially shows a higher acid resistance than the ether linkage produced by a crosslinking reaction between the hydroxyl group of acrylic resin and alkoxymethyl group of amino resin. Further, the coating composition moisture-cured by the crosslinking of alkoxysilane group affords a highly acid-resistant crosslinked portion, thereby achieving a further marked improvement of acid resistance. Moreover, this coating composition is provided without impairing the excellent properties of amino resin crosslinking component. The present invention has been accomplished based on these novel findings.

The coating composition of this invention will be described below in greater detail.

(a) Acrylic polymer

The acrylic polymer is prepared by copolymerizing about 2.5 to about 30% by weight of an alkoxysilane-containing vinyl monomer which is represented by the formula

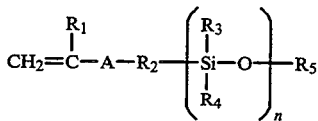

(I)

wherein A is

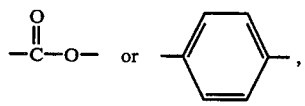

$R_1$ is a hydrogen atom or a methyl group, $R_2$ is a bivalent aliphatic saturated hydrocarbon group having 1 to 6 carbon atoms, $R_3$ and $R_4$ are the same or different and are each a phenyl group, an alkyl group having 1 to 6 carbon atoms or an alkoxy group having 1 to 10 carbon atoms, $R_5$ is an alkyl group having 1 to 10 carbon atoms, and n is an integer of 1 to 100, about 5 to about 50% by weight of an acetoacetoxy-containing vinyl monomer and about 20 to about 92.5% by weight of a vinyl monomer which is copolymerizable with the above vinyl monomers.

Examples of the groups in the compound of the formula (I) are given below.

Examples of the bivalent aliphatic saturated hydrocarbon group of 1 to 6 carbon atoms represented by $R_2$ in the formula (I) are straight- or branched-chain alkylene groups such as methylene, ethylene, propylene, 1,2-butylene, 1,3-butylene, 2,3-butylene, tetramethylene, ethylethylene, pentamethylene, hexamethylene, etc.

Examples of the alkyl group of 1 to 6 carbon atoms represented by $R_3$ and $R_4$ are straight- or branched-chain alkyl groups such as methyl, ethyl, n-propyl, isopropyl, n-butyl, isobutyl, sec-butyl, tert-butyl, n-pentyl, isopentyl, neopentyl, n-hexyl, isohexyl, etc. Examples of the alkyl group of 1 to 10 carbon atoms represented by $R_5$ include not only such groups but n-heptyl, 1-methylpentyl, 2-methylhexyl, n-octyl, n-nonyl, n-decyl, etc.

Examples of the alkoxy group of 1 to 10 carbon atoms represented by $R_3$ and $R_4$ are straight- or branched-chain alkoxy groups such as methoxy, ethoxy, n-propoxy, isopropoxy, n-butoxy, isobutoxy, sec-butoxy, tert-butoxy, n-pentoxy, isopentoxy, n-hexyloxy, isohexyloxy, n-octyloxy, etc.

When n is 2 or more, the $R_3$ groups or $R_4$ groups may be the same or different.

Of the compounds of the formula (I) to be used in the invention, those wherein A is

are, for example,

γ-(meth)acryloxyethyltrimethoxysilane,
γ-(meth)acryloxypropyltrimethoxysilane,
γ-(meth)acryloxypropyltriethoxysilane,
γ-(meth)acryloxypropyltripropoxysilane,
γ-(meth)acryloxypropylmethyldimethoxysilane,
γ-(meth)acryloxypropylmethyldiethoxysilane,
γ-(meth)acryloxypropylmethyldipropoxysilane,
γ-(meth)acryloxybutylphenyldimethoxysilane,
γ-(meth)acryloxybutylphenyldiethoxysilane,
γ-(meth)acryloxybutylphenyldipropoxysilane,
γ-(meth)acryloxypropyldimethylmethoxysilane,
γ-(meth)acryloxypropyldimethylethoxysilane,
γ-(meth)acryloxypropylphenylmethylmethoxysilane,
γ-(meth)acryloxypropylphenylmethylethoxysilane,

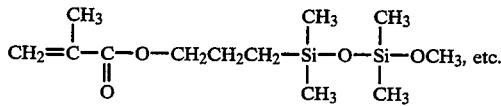

Of the compounds of the formula (I), those wherein A is

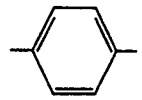

are, for example,

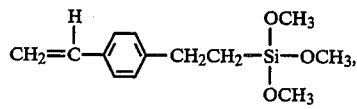

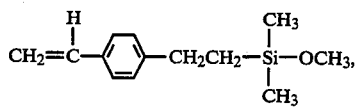

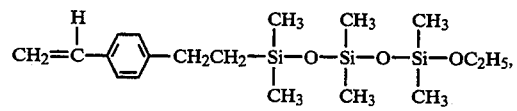

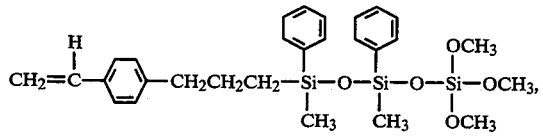

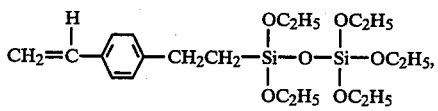

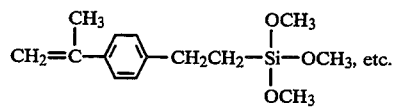

Of the compounds of the formula (I), preferred are acryloxypropyltrimethoxysilane, methacryloxypropyltrimethoxysilane, methacryloxypropyltri-n-butoxysilane, acryloxypropylmethyldimethoxysilane, methacryloxypropylmethyldimethoxysilane, methacryloxypropylmethyl-n-butoxysilane, etc.

The acetoacetoxy-containing vinyl monomer for use in the invention can be prepared by reacting diketene with a monoethylenically unsaturated monomer having a functional group such as a hydroxyl group or by ester exchange between such monomer and an ester of acetoacetic acid. Examples of the monomer are acetoacetoxyethyl methacrylate, acetoacetoxyethyl acrylate, etc.

Examples of the vinyl monomer which is copolymerizable with the alkoxysilane-containing vinyl monomer and acetoacetoxy-containing vinyl monomer are compounds which have one polymerizable unsaturated linkage per molecule and which include $C_{1-18}$ alkyl or cycloalkyl esters of (meth)acrylic acid such as methyl (meth)acrylate, ethyl (meth)acrylate, propyl (meth)acrylate, n-butyl (meth)acrylate, iso-butyl (meth)acrylate, tert-butyl (meth)acrylate, 2-ethylhexyl (meth)acrylate, cyclohexyl (meth)acrylate, n-octyl (meth)acrylate, lauryl (meth)acrylate, dodecyl (meth)acrylate, stearyl (meth)acrylate and the like; alkoxyalkyl esters of (meth)acrylic acid such as methoxybutyl (meth)acrylate, methoxyethyl (meth)acrylate, ethoxybutyl (meth)acrylate and the like; esters of (meth)acrylic acid with aromatic alcohols such as benzyl (meth)acrylate and the like; hydroxyl-containing vinyl monomers such as ε-caprolactone adducts of hydroxyethyl (meth)acrylate, hydroxypropyl (meth)acrylate, hydroxybutyl (meth)acrylate and hydroxyethyl (meth)acrylate, and ethylene and propylene adducts of hydroxyethyl (meth)acrylate; carboxyl-containing vinyl monomers such as (meth)acrylic acid, maleic anhydride and the like; glycidyl-containing vinyl monomers such as glycidyl (meth)acrylate and the like; amide-type vinyl monomers such as (meth)acrylamide, N-methylolacrylamide, N-methylolmethacrylamide and the like; amine-type vinyl monomers such as dimethylaminoethyl (meth)acrylate, diethylaminoethyl (meth)acrylate, tert-butylaminoethyl methacrylate and the like; aromatic vinyl compounds such as styrene, vinyl toluene, p-chlorostyrene, p-tert butylstyrene and the like; fluorine-containing compounds such as "VISCOAT 8F", "VISCOAT 8FM", "VISCOAT 3F" and "VISCOAT 3FM" (trademarks, (meth)acrylates with fluorine atoms in the side chain manufactured by Osaka Organic Chemical Industry Ltd.), perfluorocyclohexyl (meth)acrylate, perfluorocyclohexyl ethylene and the like, (meth)acrylonitrile and like cyano-containing unsaturated compounds; vinyl acetate, vinyl benzoate and like vinyl esters; and n-butyl vinyl ether, methyl vinyl ether, ethyl vinyl ether and like vinyl ethers.

The amount of the alkoxysilane-containing vinyl monomer to be copolymerized is about 2.5 to about 30% by weight, preferably about 5 to about 20% by weight. Less than 2.5% by weight used impairs the acid resistance of the cured coating, whereas more than 30% by weight used reduces the storage stability of the composition. The amount of the acetoacetoxy-containing vinyl monomer to be copolymerized is about 5 to about 50% by weight, preferably about 5 to about 40% by weight. Less than 5% by weight used results in slow progress of reaction between the amino resin and the acetoacetoxy group, thereby reducing the curability of the composition and the acid resistance of the coating, whereas more than 50% by weight used diminishes the water resistance of the coating.

The alkoxysilane-containing vinyl monomer, acetoacetoxy-containing vinyl monomer and other copolymerizable vinyl monomer are copolymerized in the same manner as by the conventional method for synthesis of acrylic resin, vinyl resin or the like, as by dissolving or dispersing the monomers in an organic solvent and heating the solution or the dispersion with stirring at a temperature of about 60° to about 180° C. in the presence of a radical polymerization initiator. The reaction time is usually about 1 to about 10 hours.

Useful organic solvents are hydrocarbon solvents such as heptane, toluene, xylene, octane, mineral spirit and the like; ester solvents such as ethyl acetate, n-butyl acetate, isobutyl acetate, methyl cellosolve acetate, butylcarbitol acetate and the like; ketone solvents such as methyl ethyl ketone, methyl isobutyl ketone, diisobutyl ketone and the like; alcohol solvents such as ethanol, isopropanol, n-butanol, sec-butanol, isobutanol and the like; and ether solvents such as n-butyl ether, dioxane, ethylene glycol monomethyl ether, ethylene glycol monoethyl ether and the like. Of these solvents, preferably the hydrocarbon solvent is used in mixture with other solvents to increase the dissolving power.

Useful radical polymerization initiators can be any of azo type initiators such as 2,2'-azobisisobutylonitrile and 2,2'-azobis(2,4-dimethylvaleronitrile), and peroxide-type initiators such as benzoyl peroxide, lauryl peroxide, tert-butyl-peroxy-octoate and tert-butyl-peroxy-2-ethylhexanoate. These polymerization initiators are used in an amount of about 0.2 to about 10 parts by weight, preferably about 0.5 to about 5 parts by weight, per 100 parts by weight of the monomers used for the copolymerization.

The acrylic polymer has a number average molecular weight of about 3,000 to about 500,000, preferably about 5,000 to about 100,000.

The acrylic polymer for use as the component (a) in the invention is prepared by copolymerizing, as described above, the alkoxysilane-containing vinyl monomer which is the compound of the formula (I), the acetoacetoxy-containing vinyl monomer and other vinyl monomer. The obtained polymer has the advantage of having C—C bonds introduced therein which are less hydrolyzable and more highly acid-resistant than hydroxyl-containing acrylic resins conventionally used as a base resin for an amino resin crosslinking component. Further, since the alkoxysilane group of the acrylic polymer introduces a highly acid-resistant crosslinked portion into the coating, the acrylic polymer when used as a base resin for an amino resin crosslinking component provides the coating with excellent surface properties such as high resistance to acids, weather, water, staining, solvents, scratch, etc., particularly remarkably high acid resistance.

(b) Amino resin

Amino resins which can be used in the invention include conventional, partially or completely methylolated amino resins produced by the reaction of an aldehyde and an amino component such as melamine, urea, benzoguanamine, acetoguanamine, steroguanamine, spiroguanamine, dicyandiamide and the like. Useful aldehydes include formaldehyde, paraformaldehyde, acetoaldehyde, benzaldehyde, etc. Also usable are these methylolated amino resins etherified with a suitable alcohol. Alcohols useful for etherification are methyl alcohol, ethyl alcohol, n-propyl alcohol, isopropyl alcohol, n-butyl alcohol, isobutyl alcohol, 2-ethylbutanol, 2-ethylhexanol, etc. It is desirable in the invention to use hexamethoxymethyl melamine or an etherified melamine resin having the methoxy groups partially or completely replaced by an alcohol of 4 or more carbon atoms. In this case, it is preferred to add an acid neutralized with an amine compound as a curing catalyst. Examples of useful acids are p-toluenesulfonic acid, dodecylbenzenesulfonic acid, phosphoric acid, monobutylphosphoric acid, phosphorous acid, monoisopropylphosphorous acid, trichloroacetic acid, etc. Examples of useful amine compounds are monobutylamine, dibutylamine, triethylamine, diethanolamine, 2-amino-2-methylpropanol, dimethyloxazolidine, imidazol, etc.

The curable coating composition of the invention contains the components (a) and (b) as the main components. The mixing ratio of these components can be selected according to a specific purpose. The amount of the component (a) used is about 50 to about 95% by weight, preferably about 55 to about 90% by weight, more preferably about 55 to about 80% by weight, based on the total amount of the resin solids in the coating composition. The amount of the component (b) used is about 5 to about 50% by weight, preferably about 10 to about 45% by weight, more preferably about 20 to about 45% by weight, based on the total amount of the resin solids in the coating composition. Less than 5% by weight of the component (b) used markedly reduces the resistance to water and weather, whereas more than 50% by weight thereof used significantly deteriorates the mechanical properties and the interlaminar adhesion in the layered coating.

The coating composition of the invention may contain a component (c) in addition to the acrylic resin (a) and the amino resin (b) used as the main components. The component (c) is a nonaqueous particulate polymer prepared by nonaqueous dispersion polymerization of a radical polymerizable unsaturated monomer(s) using a specific alkoxysilane- and acetoacetoxy-containing polymer as a dispersion stabilizer. The component (c), even if used in a small amount, imparts a low viscosity and high solids to a coating composition, remarkably improves the coating efficiency and provides a coating with further enhanced resistance to acids and impact. In other words, the component (c) thus added was found to produce surprisingly remarkable results.

The nonaqueous particulate polymer serving as the component (c) is prepared by polymerizing a radical polymerizable unsaturated monomer or monomers in an organic liquid, wherein the resulting polymer is insoluble, in the presence of the dispersion stabilizer resin which is a copolymer prepared from one or more alkoxysilane-containing vinyl monomers of the formula (I), and one or more acetoacetoxy-containing vinyl monomers, both used as essential monomer components.

The copolymer which is used as the dispersion stabilizer resin in the preparation of the component (c) is prepared from the essential components, namely at least one of the alkoxysilane-containing vinyl monomers of the formula (I) and at least one of the acetoacetoxy-containing vinyl monomers. The proportions of these essential monomer components are selectable from a wide range. Usually it is suitable to use about 1 to about 99% by weight, preferably about 5 to about 30% by weight, of the monomer of the formula (I), and about 1 to about 99% by weight, preferably about 5 to about 30% by weight, of the acetoacetoxy-containing vinyl monomer, based on the total monomers used.

In the preparation of the copolymer, other copolymerizable monomers may be optionally used. It is preferred to use long-chain vinyl monomers as such monomers in view of the copolymerizability and the solubility in organic liquids. Preferred examples of such monomers are compounds which have one polymerizable unsaturated linkage per molecule and which include $C_{1-18}$ alkyl or cycloalkyl esters of (meth)acrylic acid such as n-butyl (meth)acrylate, isobutyl (meth)acrylate, tert-butyl (meth)acrylate, 2-ethylhexyl (meth)acrylate, cyclohexyl (meth)acrylate, n-octyl (meth)acrylate, lauryl (meth)acrylate, dodecyl (meth)acrylate and the like; alkoxyalkyl esters of (meth)acrylic acid such as methoxybutyl (meth)acrylate, methoxyethyl (meth)acrylate, ethoxybutyl (meth)acrylate and the like; esters of aromatic alcohols with (meth)acrylic acid such as benzyl (meth)acrylate; adducts of glycidyl (meth)acrylates or hydroxyl alkyl esters of (meth)acrylic acid with monocarboxylic acid compounds such as capric acid, lauric acid, linoleic acid, oleic acid or the like; adducts of (meth)acrylic acid with monoepoxy compounds such as "Cardura E-10" (trademark, Shell Chemicals, Ltd.); monoesters of diesters of $\alpha,\beta$-unsaturated carboxylic acids other than (meth)acrylic acid such as itaconic acid, itaconic anhydride, crotonic acid, maleic acid, maleic anhydride, fumaric acid, citraconic acid or the like with $C_{4-18}$ monohydric alcohols such as butyl alcohol, pentyl alcohol, heptyl alcohol, octyl alcohol, stearyl alcohol or the like; carboxyl-containing vinyl monomers such as (meth)acrylic acid, maleic anhydride and the like; hydroxyl-containing vinyl monomers such as $\epsilon$-caprolactone adducts of hydroxyethyl (meth)acrylate, hydroxypropyl (meth)acrylate, hydroxybutyl (meth)acrylate and hydroxyethyl (meth)acrylate, and ethylene and propylene adducts of hydroxyethyl (meth)acrylate; glycidyl-containing vinyl monomers such as glycidyl (meth)acrylate and the like; amide-type vinyl monomers such as (meth)acrylamide, N-methylolacrylamide, N-methylolmethacrylamide and the like; amine-type vinyl monomers such as dimethylaminoethyl (meth)acrylate, diethylaminoethyl (meth)acrylate, tert-butylaminoethyl methacrylate and the like; aromatic vinyl compounds such as styrene, vinyl toluene, p-chlorostyrene, p-tert butylstyrene and the like; fluorine-containing compounds such as "VISCOAT 8F", "VISCOAT 8FM", "VISCOAT 3F" and "VISCOAT 3FM" (trademarks, (meth)acrylates with fluorine atoms in the side chain manufactured by Osaka Organic Chemical Industry Ltd.), perfluorocyclohexyl (meth)acrylate, perfluorocyclohexyl ethylene and the like; (meth)acrylonitrile and like cyano-containing unsaturated compounds; vinyl acetate, vinyl benzoate and like vinyl esters; and n-butyl vinyl ether, methyl vinyl ether and like vinyl ethers.

The copolymerization for preparing the dispersion stabilizer resin to be used in preparing the component (c) is carried out usually using a radical polymerization initiator. Useful radical polymerization initiators are 2,2'-azobisisobutyronitrile, 2,2'-azobis (2,4-dimethylvaleronitrile) and like azo-type initiators, benzoyl peroxide, lauryl peroxide, tert-butyl-peroxy-octoate, tert-butyl-peroxy-2-ethylhexanoate and like peroxide-type initiators, etc. These polymerization initiators are used in an amount of about 0.2 to about 10 parts by weight, preferably about 0.5 to about 5 parts by weight, per 100 parts by weight of the monomers to be copolymerized. A suitable temperature for the copolymerization reaction is about 60° to about 160° C. The reaction is completed in about 1 to about 15 hours.

It is suitable that the copolymer for use as the dispersion stabilizer resin in the preparation of the component (c) have a weight average molecular weight of about 5,000 to about 100,000 (a number average molecular weight of about 1,000 to about 60,000), preferably about 5,000 to about 50,000. When the copolymer is less than about 5,000 in molecular weight, the dispersed particles show reduced stability, and agglomeration or sedimentation tends to occur. On the other hand, when the copolymer is more than about 100,000 in molecular weight, it exhibits a markedly increased viscosity, and may be difficult to handle. Hence they are undesirable.

In the preparation of the component (c), the dispersion stabilizer resin may be used singly or as a mixture of two or more species differing in the formulation or in the molecular weight. When required, the resin may be used in mixture with a small amount of another dispersion stabilizer, such as butyl etherified melamine-formaldehyde resins, alkyd resins, or acrylic resins which do not contain the alkoxysilane-containing vinyl monomer of the formula (I) and/or the acetoacetoxy-containing vinyl monomer as the monomer components.

In the preparation of the component (c), the radical polymerizable unsaturated monomer or monomers are polymerized in an organic liquid in the presence of said dispersion stabilizer resin to give a nonaqueous dispersion of polymer particles insoluble in said organic liquid.

Organic liquids for use in said polymerization include those in which the polymer particles produced by the polymerization are substantially insoluble but which dissolve well the stabilizer resin and the radical polymerizable unsaturated monomer(s). Specific examples of the organic liquid are aliphatic hydrocarbons such as hexane, heptane, octane, etc.; aromatic hydrocarbons such as benzene, toluene, xylene, etc.; alcohols such as methyl alcohol, isopropyl alcohol, n-butyl alcohol, isobutyl alcohol, octyl alcohol, etc.; ethers such as cellosolve, butyl cellosolve, diethylene glycol monobutyl ether, etc.; ketones such as methyl isobutyl ketone, diisobutyl ketone, methyl ethyl ketone, methyl hexyl ketone, ethyl butyl ketone, etc.; and esters such as ethyl acetate, isobutyl acetate, amyl acetate, 2-ethylhexyl acetate, etc. These organic liquids are usable singly or at least two of them can be used in mixture. These liquids are usually used as a mixture containing aliphatic hydrocarbon predominantly and aromatic hydrocarbon, alcohol, ether, ketone, ester or the like.

Radical polymerizable unsaturated monomers to be polymerized in said polymerization show a high polymerizability and have a fewer number of carbon atoms than the monomers used for the dispersion stabilizer resin. These monomers are preferred because they can be readily made into dispersed polymer particles.

Examples of such radical polymerizable unsaturated monomers are $C_{1-18}$ alkyl or cycloalkyl esters of (meth)acrylic acid such as methyl (meth)acrylate, ethyl (meth)acrylate, propyl (meth)acrylate, n-butyl (meth)acrylate, isobutyl (meth)acrylate, tert-butyl (meth)acrylate, 2-ethylhexyl (meth)acrylate, cyclohexyl (meth)acrylate, n-octyl (meth)acrylate, lauryl (meth)acrylate, dodecyl (meth)acrylate, stearyl (meth)acrylate and the like; alkoxyalkyl esters of (meth)acrylic acid such as methoxybutyl (meth)acrylate, methoxyethyl (meth)acrylate, ethoxybutyl (meth)acrylate and the like; esters of aromatic alcohols with (meth)acrylic acid such as benzyl (meth)acrylate; adducts of glycidyl (meth)acrylate or hydroxyalkyl esters of (meth)acrylic acid with monocarboxylic acid compounds such as capric acid, lauric acid, linoleic acid, oleic acid or the like; adducts of (meth)acrylic acid with monoepoxy compounds such as "Cardura E-10" (trademark, Shell Chemicals Ltd.); aromatic vinyl compounds such as styrene, α-methylstyrene, vinyl toluene, p-chlorostyrene, p-tert-butylstyrene and the like; monoesters or diesters of α,β-unsaturated carboxylic acids other than (meth)acrylic acid such as itaconic acid, itaconic anhydride, crotonic acid, maleic acid, maleic anhydride fumaric acid, citraconic acid or the like with $C_{4-18}$ monohydric alcohols such as butyl alcohol, pentyl alcohol, heptyl alcohol, octyl alcohol, stearyl alcohol or the like; hydroxyl-containing vinyl monomers such as ε-caprolactone adducts of hydroxyethyl (meth)acrylate, hydroxypropyl (meth)acrylate, hydroxybutyl (meth)acrylate or hydroxyethyl (meth)acrylate, and ethylene and propylene adducts of hydroxyethyl (meth)acrylate; carboxyl-containing vinyl monomers such as (meth)acrylic acid, maleic anhydride and the like; glycidyl-containing vinyl monomers such as glycidyl (meth)acrylate and the like; amide-type vinyl monomers such as (meth)acrylamide, N-methylolacrylamide, N-methylolmethacrylamide and the like; amine-type vinyl monomers such as dimethylaminoethyl (meth)acrylate, diethylaminoethyl (meth)acrylate, tert-butylaminoethyl methacrylate and the like; fluorine-containing compounds such as "VISCOAT 8F", "VISCOAT 8FM", "VISCOAT 3F" and "VISCOAT 3FM" (trademarks, (meth)acrylates with fluorine atoms in the side chain manufactured by Osaka Organic Chemical Industry Ltd.), perfluorocyclohexyl (meth)acrylate, perfluorocyclohexyl ethylene and the like; (meth)acrylonitrile and like cyano-containing unsaturated compounds; vinyl esters such as vinyl acetate, vinyl benzoate and the like; vinyl ethers such as n-butyl vinyl ether, methyl vinyl ether, ethyl vinyl ether and the like; polyvinyl compounds such as 1,6-hexanediol di(meth)acrylate, trimethylolpropane tri-(meth)acrylate, divinyl benzene and the like; and α-olefin compounds such as ethylene, propylene, vinyl chloride, vinylidene chloride and the like.

Preferred as the monomer components constituting the polymer particles is a combination of monomers each having a fewer carbon atoms than the monomer components for the dispersion stabilizer resin as stated above, because these monomer components can be stably made into polymer particles. Monomers which are preferable from this viewpoint are esters of (meth)acrylic acid, aromatic vinyl compounds, (meth)acrylonitriles and the like which have 8 or less, preferably 4 or less, carbon atoms.

These radical polymerizable unsaturated monomers are usable singly or at least two of them can be used in mixture.

The polymerization of said radical polymerizable unsaturated monomer(s) is conducted usually using a radical polymerization initiator. Usable radical polymerization initiators are 2,2'-azobisisobutyronitrile, 2,2'-azobis(2,4-dimethylvaleronitrile) and like azo-type initiators, benzoyl peroxide, lauryl peroxide, tert-butyl-peroxy-octoate, tert-butyl-peroxy-2-ethylhexanoate and like peroxide-type initiators. These polymerization initiators are used in an amount of about 0.2 to about 10 parts by weight, preferably about 0.5 to about 5 parts by weight, per 100 parts by weight of the monomers to be polymerized.

The amount of the dispersion stabilizer resin to be used in said polymerization can be selected from a wide range depending on the kind of resins used and other factors. The radical polymerizable unsaturated monomer(s) is used in an amount of about 3 to about 240 parts by weight, preferably about 5 to about 82 parts by weight, per 100 parts by weight of the dispersion stabilizer resin. It is suitable that the total concentration of the dispersion stabilizer resin and the radical polymerizable unsaturated monomer(s) in the organic liquid be about 30 to about 70% by weight, preferably about 30 to about 60% by weight.

The polymerization can be conducted by known methods. A suitable temperature for the polymerization reaction is generally in the range of about 60° to about 160° C. and the reaction is completed usually in about 1 to about 15 hours.

The stable nonaqueous dispersion obtained in this way comprises a liquid phase which is a solution of the dispersion stabilizer resin in the organic liquid and a solid phase consisting of polymer particles prepared from the radical polymerizable unsaturated monomer. The particle size of the polymer particles is generally in the range of about 0.1 to about 1.0 $\mu$m. The polymer particles with a smaller particle size than said range increase the viscosity of a varnish, whereas those of larger particle size become swollen or agglomerated during the storage. Thus they are undesirable.

The component (c) can be further improved in the storage stability and mechanical properties by binding together the dispersion stabilizer resin and the polymer particles in the nonaqueous dispersion. In the case of their binding, substantially no change occurs in the state of dispersion and the polymer particles are imparted a particle size in the above range.

The dispersion stabilizer resin and the polymer particles can be bound together, for example, by partially copolymerizing the monomer components having a functional group such as a hydroxyl group, acid group, acid anhydride group, epoxy group, methylol group, isocyanate group, amide group, amino group or the like in the step of producing the dispersion stabilizer resin and copolymerizing the monomer components having a functional group reactive with the foregoing functional group, such as a hydroxyl group, acid group, acid anhydride group, epoxy group, methylol group, isocyanate group, amide group, amino group, etc. in the step for producing the polymer particles. Examples of suitable combinations of functional groups are isocyanate group/hydroxyl group, isocyanate group/methylol group, epoxy group/acid anhydride group, epoxy group/amino group, isocyanate group/amide group, acid anhydride group/hydroxyl group, etc.

Monomers having such functional groups include, for example, (meth)acrylic acid, crotonic acid, maleic acid, maleic anhydride, itaconic acid, itaconic anhydride, fumaric acid citraconic acid and like $\alpha,\beta$-ethylenically unsaturated, carboxylic acids; glycidyl (meth)acrylate, vinyl glycidyl ether, allyl glycidyl ether and like glycidyl group-containing compounds; (meth)acrylamide, N,N-dimethyl (meth)acrylamide, N-alkoxymethylated (meth)acrylamide, diacetone acrylamide, N-methylol (meth)acrylamide and like carboxylic acid amide-type compounds; p-styrene sulfonamide, N-methyl-p-styrene sulfonamide, N,N-dimethyl-p-styrene sulfonamide and like sulfonic acid amide group-containing compounds; (meth)acrylic acid-tert-butylaminoethyl and like amino group-containing compounds; condensates of 2-hydroxyethyl (meth)acrylate with phosphoric acid or phosphoric acid esters, addition products obtained by adding phosphoric acid or phosphoric acid ester to the glycidyl group of glycidyl group-containing compounds such as glycidyl (meth)acrylate and like phosphoric acid group-containing compounds; 2-acrylamide-2-methyl-propanesulfonic acid and like sulfonic acid group-containing compounds; equimolar addition products of m-isopropenyl-$\alpha,\alpha$-dimethylbenzyl isocyanate, isophorone diisocyanate or tolylene diisocyanate with hydroxy (meth)acrylate, isocyanoethyl methacrylate and like isocyanate group-containing compounds; etc.

The dispersion stabilizer resin can be bound to the polymer particles by other methods, e.g. by polymerizing the radical polymerizable unsaturated monomer in the presence of a dispersion stabilizer resin having a polymerizable double bond. A polymerizable double bond can be introduced into the dispersion stabilizer resin by the following methods. For example, using carboxylic acid, phosphoric acid, sulfonic acid or like acid group-containing unsaturated monomer as a monomer component for the resin, the acid group of the monomer is reacted with glycidyl (meth)acrylate, vinyl glycidyl ether, allyl glycidyl ethel or like glycidyl group-containing unsaturated monomer. Of course, the introduction can be conducted also in a converse manner by introducing a glycidyl group into the resin and reacting the resin with the acid group-containing unsaturated monomer. These reactions can be carried out under conventional conditions.

Other methods are available for binding the dispersion stabilizer resin to the polymer particles and include those comprising preparing a nonaqueous dispersion comprising a dispersion stabilizer resin and polymer particles each having functional groups introduced therein which are not reactive with each other, and then admixing the dispersion with a binder for binding them.

Stated more specifically, for instance a hydroxyl-containing unsaturated monomer or a mixture of such monomer and other unsaturated monomer is polymerized in the presence of a hydroxyl-containing dispersion stabilizer resin and an organic liquid to prepare a nonaqueous dispersion comprising the dispersion stabilizer resin and the polymer particles each of which contains a hydroxyl group. Thereafter, a polyisocyanate compound is added to the dispersion, followed by reaction at room temperature for several days, or at about 60° to about 100° C. for about 1 to about 5 hours. Examples of the polyisocyanate compound can be any of those having at least one isocyanate group in the molecule, such as tolylene diisocyanate, xylylene diisocyanate, 4,4'-diphenylmethane diisocyanate and like aromatic diisocyanates or their hydrides; hexamethylene diisocyanate, lysinediisocyanate, dimer acid diisocyanate and like aliphatic diisocyanates; and isophorone diisocyanate and like alicyclic diisocyanates. Available in addition to the above combinations are a combination of an acid group-containing dispersion stabilizer resin and polymer particles, and polyepoxide, a combination of epoxy group-containing dispersion stabilizer resin and polymer particles, and polycarboxylic acid, and a combination of epoxy or isocyanate group-containing dispersion stabilizer resin and polymer particles, and polysulfide compound, etc. Useful polyepoxides include, for example, a bisphenol A epoxy resin, bisphenol F epoxy resin, novolak-type epoxy resin, epoxy group-containing acrylic resin and the like. Examples of polycarboxylic acids are adipic acid, sebacic acid, azelaic acid, isophthalic acid and the like. Useful polysulfides include, for example, pentamethylenedisulfide, hexamethylenedisulfide, poly(ethylenedisulfide) and the like.

In this way, the dispersion stabilizer resin can be chemically bound to the polymer particles. In this case, it is sufficient if the dispersion stabilizer resin and/or polymer particles have a functional group or polymerizable double bond which is an average of 0.1 in number per molecule of the resin and/or particle.

The obtained nonaqueous dispersion containing the dispersion stabilizer resin chemically bound to the polymer particles is excellent in the storage stability and provides a coating film with chemically and mechanically remarkable properties.

When the polymer particles obtained in the form of a nonaqueous dispersion are used as the component (c) in combination with the acrylic polymer (a) and the amino resin (b), the mixing ratio of the component (c) can also be suitably selected depending on the contemplated purpose, but it is preferred to add to the components (a) and (b) the dispersion serving as the component (c) in an amount of about 5 to about 25% by weight, preferably about 5 to about 20% by weight, and more preferably about to about 20% by weight, calculated as the polymer particles based on the total resin solids of the coating composition.

Preferably, the coating composition of the present invention may incorporate a curing catalyst for the alkoxysilane group when so required. Typical of such catalyst are acidic compounds, basic compounds and tin-containing compounds, although useful catalysts are not limited thereto. These compounds are used singly or as a mixture of a tin-containing compound with an acidic compound or a basic compound. These curing catalysts impart excellent low temperature curability and ambient temperature curability to the coating composition. Examples of such catalyst are acidic compounds such as p-toluenesulfonic acid, trichloroacetic acid, phosphoric acid, mono-n-propylphosphoric acid, monoisopropylphosphoric acid, mono-n-butylphosphoric acid, monoisobutylphosphoric acid, mono-tert-butylphosphoric acid, monooctylphosphoric acid, monodecylphosphoric acid and like monoalkylphosphoric acids, di-n-propylphosphoric acid, diisopropylphosphoric acid, di-n-butylphosphoric acid, diisobutylphosphoric acid, di-tert-butylphosphoric acid, dioctylphosphoric acid, didecylphosphoric acid and like dialkylphosphoric acids, phosphoric acid ester of β-hydroxyethyl (meth)acrylate, mono-n-propylphosphorous acid, monoisopropylphosphorous acid, mono-n-butylphosphorous acid, monoisobutylphosphorous acid, mono-tert-butylphosphorous acid, monooctylphosphorous acid, monodecylphosphorous acid and like monoalkylphosphorous acids, di-n-propylphosphorous acid, diisopropylphosphorous acid, di-n-butylphosphorous acid, diisobutylphosphorous acid, di-tert-butylphosphorous acid, dioctylphosphorous acid, didecylphosphorous acid and like dialkylphosphorous acids; tin-containing compounds such as tin octylate, dibutyltin diacetate, dibutyltin dioctate, dibutyltin dilaurate, and dibutyltin maleate; and basic compounds such as butylamine, tert-butylamine, dibutylamine, hexylamine, ethylenediamine, triethylamine, isophorone-diamine, imidazole, lithium hydroxide, potassium hydroxide, sodium methylate, etc.

A preferred amount of the curing catalyst used is about 0.01 to about 10 parts by weight per 100 parts by weight of the total amount of solids of the acrylic polymer (a) and the particulate polymer (c). If the catalyst is used in an amount of less than the above range, a reduced curability tends to result. On the other hand, a more amount of the catalyst is likely to give a brittle coating and to impair the storage stability. Hence they are undesirable.

The coating composition of the present invention may contain various additives when required. Useful additives include, for example, pigments, dyes, plasticizers, thixotropic agents, coated surface modifiers, ultraviolet absorbers, light stabilizers, etc. As pigments which may be incorporated in the coating composition, there may be mentioned, for example, inorganic coloring pigments (e.g. titanium dioxide, iron oxide and carbon black), organic coloring pigments (e.g. phthalocyanine blue, perylene red and quinacridone violet) and metallic pigments (e.g. aluminum powder and bronze powder). Examples of useful plasticizers are dimethyl phthalate, dioctyl phthalate and like low-molecular-weight plasticizers, vinyl polymer plasticizers, polyester plasticizers and like high-molecular-weight plasticizers, etc. When required, it is possible to add curing agents conventionally used such as epoxy resins, polyisocyanate resins and the like. Furthermore, the coating composition of the invention may contain other acrylic resins, alkyd resins, polyester resins, epoxy resins and the like.

The coating composition of the invention can be provided as a clear coating composition, a solid color coating composition, a metallic coating composition or the like, when required by addition of various known additives.

Any of solvents conventionally used for acrylic resin/melamine resin coating compositions can be used in preparing the coating composition of the present invention. Examples of such solvents are water and organic solvents such as toluene, xylene, methyl ethyl ketone, ethyl acetate, dioxane and butanol. These solvents can be used singly or in mixture.

The coating composition of the invention has high curability and is cured on crosslinking even at a low temperature of up to 100° C. Usually it can be cured by heating at about 120° to about 180° C. for about 10 to about 60 minutes.

The coating composition of the invention can be suitably used as coating materials, particularly as top coating materials, for coating motor vehicles, household electric appliances, furniture, building materials and so on.

The present invention will be described below in more detail with reference to the following Preparation Examples, Examples and Comparison Examples. In Examples, the parts and the percentages are all by weight.

I. (a) Preparation Examples of acrylic polymers

| (1) (a-1) | |
| --- | --- |
| Styrene | 100 parts |
| n-Butyl methacrylate | 300 parts |
| 2-Hydroxyethyl acrylate | 150 parts |
| γ-Methacryloxypropyltrimethoxysilane | 150 parts |
| Acetoacetoxyethyl methacrylate | 300 parts |
| Azobisisobutyronitrile | 30 parts |

A mixture of the above ingredients was added dropwise to the same quantity of xylene at 120° C. over a period of 3 hours and the resulting mixture was aged for 2 hours at the same temperature. The transparent polymer thus obtained had a number average molecular weight of 10,000 as determined by GPC.

| (2) (a-2) | |
| --- | --- |
| Methyl methacrylate | 200 parts |
| n-Butyl acrylate | 300 parts |
| 1,4-Butanediol monoacrylate | 150 parts |
| γ-Methacryloxypropyltrimethoxysilane | 150 parts |

| -continued | |
|---|---|
| Acetoacetoxyethyl methacrylate | 200 parts |
| Azobisisobutyronitrile | 30 parts |

A mixture of the above ingredients was added dropwise to a solvent mixture of 500 parts of xylene and 500 parts of n-butanol at 120° C. over a period of 3 hours, followed by aging for 2 hours at the same temperature. The transparent polymer thus obtained had a number average molecular weight of 12,000 as determined by GPC.

| (3) (a-3) | |
|---|---|
| Styrene | 200 parts |
| n-Butyl methacrylate | 350 parts |
| 2-Hydroxyethyl acrylate | 150 parts |
| Acetoacetoxyethyl methacrylate | 300 parts |
| Azobisisobutyronitrile | 30 parts |

A mixture of the above ingredients was added dropwise to the same quantity of xylene at 120° C. over a period of 3 hours and the resulting mixture was aged for 2 hours at the same temperature. The transparent polymer thus obtained had a number average molecular weight of 10,000 as determined by GPC.

| (4) (a-4) | |
|---|---|
| Styrene | 300 parts |
| n-Butyl methacrylate | 400 parts |
| 2-Hydroxyethyl acrylate | 150 parts |
| γ-Methacryloxypropyltrimethoxysilane | 150 parts |
| Azobisisobutyronitrile | 30 parts |

A mixture of the above ingredients was added dropwise to the same quantity of xylene at 120° C. over a period of 3 hours and the resulting mixture was aged for 2 hours at the same temperature. The transparent polymer thus obtained had a number average molecular weight of 10,000 as determined by GPC.

II. (c) Preparation Examples of nonaqueous polymer particles

| (1) Synthesis of dispersion stabilizer resin (N) | |
|---|---|
| Isobutyl acetate | 400 parts |
| Toluene | 400 parts |

A mixture of the above ingredients was refluxed with heating. To this mixture were added dropwise the following monomers and polymerization initiator over a period of 3 hours, and thereafter the resulting mixture was aged for 2 hours.

| | |
|---|---|
| Styrene | 100 parts |
| 2-Ethylhexyl methacrylate | 400 parts |
| 2-Hydroxyethyl acrylate | 150 parts |
| γ-Methacryloxypropyltrimethoxysilane | 50 parts |
| Acetoacetoxyethyl methacrylate | 300 parts |
| Azobisisobutyronitrile | 30 parts |

The transparent polymer thus obtained had a number average molecular weight of 10,000 as determined by GPC.

(2) Preparation of nonaqueous dispersion (N-1)

| -continued | |
|---|---|
| Heptane | 930 parts |
| Varnish of 55% dispersion stabilizer resin (N) | 980 parts |

The above ingredients were placed into a flask and refluxed with heating. To the resulting mixture were added dropwise the following monomers and polymerization initiator over a period of 3 hours, followed by aging for 2 hours.

| | |
|---|---|
| Styrene | 150 parts |
| Methyl methacrylate | 400 parts |
| Acrylonitrile | 300 parts |
| 2-Hydroxyethyl acrylate | 150 parts |
| Azobisisobutyronitrile | 15 parts |

The nonaqueous dispersion thus obtained was a stable milky dispersion of polymer particles which was 53% in nonvolatile content, B in viscosity and 0.2 to 0.3 μm in particle size of polymer particles. Even when the dispersion was allowed to stand at room temperature for 3 months, neither precipitate nor coarse particle was produced.

III. Examples and Comparison Examples

| Example 1 Clear coating composition (D-1) | |
|---|---|
| Solution (a-1) | 140 parts |
| Cymel 303 (Note 1) | 30 parts |
| Nacure 5225 (Note 2) | 1.5 parts |
| BYK-300 solution (Note 3) | 0.1 part |
| Tinuvin 900 (Note 4) | 1.0 part |

A mixture of the above ingredients was diluted with Swasol #1000 (trademark, Maruzen Petrochemical Co., Ltd.) to a viscosity of 25 sec (Ford cup #4, 20° C.). The clear coating composition thus obtained had a solids content of 45%.

(Note 1) Cymel 303: a fully methoxylated melamine resin manufactured by Mitsui-Cyanamid, Ltd.

(Note 2) Nacure 5225: a neutralized product of dodecylbenzene sulfonic acid with dimethyloxazolidine manufactured by KING INDUSTRIES INC.

(Note 3) BYK-300 solution: a surface control agent manufactured by BYK-Chemie GmbH (Note 4) Tinuvin 900: an ultraviolet absorbing agent manufactured by Ciba-Geigy Corp.

| Example 2 Clear coating composition (D-2) | |
|---|---|
| Solution (a-2) | 160 parts |
| Cymel 303 | 20 parts |
| Nacure 5225 | 2.0 parts |
| BYK-300 solution | 0.1 part |
| Tinuvin 900 | 1.0 part |

Using the above ingredients, a clear coating composition was prepared in the same manner as in the preparation of composition D-1. The obtained clear coating composition had a solids content of 48%.

| Example 3 Clear coating composition (D-3) | |
|---|---|
| Solution (a-2) | 140 parts |
| 60% U-VAN 20SE (Note 5) | 50 parts |
| Nacure 5225 | 1.0 part |
| BYK-300 solution | 0.1 part |

-continued

| | |
|---|---|
| Tinuvin | 1.0 part |

Using a mixture of the above ingredients, a clear coating composition was prepared in the same manner as in the preparation of composition D-1. The clear coating composition thus obtained had a solids content of 44%.

(Note 5) 60% U-VAN 20SE: a butylated melamine resin manufactured by Mitsui Toatsu Chemicals, Inc.

Comparison Example 1 Clear coating composition (D-4)

| | |
|---|---|
| Solution (a-3) | 140 parts |
| Cymel 303 | 30 parts |
| Nacure 5225 | 2.0 parts |
| BYK-300 solution | 0.1 part |
| Tinuvin | 1.0 part |

Using a mixture of the above ingredients, a clear coating composition was produced in the same manner as in the preparation of composition D-1. The clear coating composition thus obtained had a solids content of 45%.

Comparison Example 2 Clear coating composition (D-5)

| | |
|---|---|
| Solution (a-4) | 140 parts |
| Cymel 303 | 30 parts |
| Nacure 5225 | 2.0 parts |
| BYK-300 solution | 0.1 part |
| Tinuvin 900 | 1.0 part |

Using a mixture of the above ingredients, a clear coating composition was produce in the same manner as in the preparation of composition D-1. The obtained clear coating composition had a solids content of 45%.

Example 4 Solid color coating composition (S-1)

| | |
|---|---|
| Titanium white JR-701 (titanium dioxide manufactured by Tayca Corporation) | 100 parts |
| Solution (a-1) | 140 parts |
| 60% U-VAN 20SE | 50 parts |
| Nacure 5225 | 2.0 parts |
| BYK-300 solution | 0.1 part |

A mixture of the above ingredients was diluted with Swasol #1000 to a viscosity of 25 sec (Ford cup #4, 20° C.). The resulting coating composition had a solids content of 45%.

Example 5 Solid color coating composition (S-2)

| | |
|---|---|
| Titanium white JR-701 | 100 parts |
| Solution (a-2) | 140 parts |
| 60% U-VAN 20SE | 50 parts |
| Nacure 5225 | 2.0 parts |
| BYK-300 solution | 0.1 part |

Using a mixture of the above ingredients, a coating composition was prepared in the same manner as in the preparation of composition S-1. The thus obtained coating composition had a solids content of 43%.

Comparison Example 3 Solid color coating composition (S-3)

| | |
|---|---|
| Titanium white JR-701 | 100 parts |
| Solution (a-3) | 140 parts |
| 60% U-VAN 20SE | 50 parts |
| Nacure 5225 | 2.0 parts |
| BYK-300 solution | 0.1 part |

Using a mixture of the above ingredients, a coating composition was prepared in the same manner as in the preparation of composition S-1. The thus obtained coating composition had a solids content of 45%.

Example 6 Clear coating composition (DN-1)

| | |
|---|---|
| Solution (a-1) | 120 parts |
| Cymel 303 | 30 parts |
| Dispersion (N-1) | 50 parts |
| Nacure 5225 | 1.5 parts |
| BYK-300 solution | 0.1 part |
| Tinuvin 900 | 1.0 part |

Using a mixture of the above ingredients, a coating composition was prepared in the same manner as in the preparation of composition D-1. The thus obtained coating composition had a solids content of 55%.

Example 7 Solid color coating composition (SN-1)

| | |
|---|---|
| Titanium white JR-701 | 100 parts |
| Solution (a-1) | 120 parts |
| 60% U-VAN 20SE | 50 parts |
| Dispersion (N-1) | 50 parts |
| Nacure 5225 | 2.0 parts |
| BYK-300 solution | 0.1 part |

Using a mixture of the above ingredients, a coating composition was prepared in the same manner as in the preparation of composition S-1. The obtained coating composition had a solids content of 56%.

IV. Results of performance tests (1) Clear coating compositions

On a mild steel sheet treated with zinc phosphate were formed an electrodeposition coating film and an intercoat coating film. The following metallic coating composition was applied to the coated sheet (dry film thickness 20 μm) and allowed to stand for 5 minutes at room temperature. Each of clear coating compositions D-1 to D-5 and DN-1 was applied to the thus coated sheet (dry film thickness 40 μm) and heated at 140° C. for 30 minutes to cure the metallic and clear coating films. Table 1 shows the results of performance tests on the coating films and the results of storage stability test on the coating compositions.

| Metallic coating composition: | |
|---|---|
| Acrylic resin (Acrydic 47-712 manufactured by Dainippon Ink And Chemicals, Incorporated) | 100 parts |
| 60% U-VAN 20SE | 60 parts |
| Aluminum paste (Alumipaste 55-519 manufactured by Toyo Aluminum K.K.) | 10 parts |

A mixture of the above ingredients was adjusted to a viscosity of 14 sec (Ford cup #4, 20° C.) with a solvent mixture of 30 parts of Swasol #1000 and 70 parts of toluene.

(2) Solid color coating compositions

In the same manner as above, an electrodeposition coating film and an intercoat coating film were formed on a mild steel sheet treated with zinc phosphate, and each of solid color coating compositions S-1 to S-3 and SN-1 was applied to the coated sheet (dry film thickness 40 μm). The coated sheet was heated at 140° C. for 30 minutes to cure the coating composition. Table 1 shows the results of performance tests on the coating films and the results of storage stability test on the coating compositions. The test methods were as follows.

Acid resistance: A half portion of a coated panel was immersed in a 40% aqueous solution of sulfuric acid and allowed to stand at 50° C. for 5 hours. Thereafter the coated panel was washed with water, and the coating surface was observed and evaluated according to the following criteria:
A:No change.

washed with water. The coating surface was observed and evaluated for water resistance according to the following criteria:
A:No change.
B:A slight degree of dulling.
C:Blushing on the coating surface.
Appearance: Evaluated with the unaided eye.
Storage stability: A 300 g quantity of diluted coating composition (Ford cup #4, 25 sec) was placed into a beaker and the beaker was temporarily covered with a piece of aluminum foil. The coating composition was stirred at room temperature for 48 hours and the viscosity of the composition (Ford cup #4) was determined to evaluate a degree of thickening.
A:Less than 20 sec.
B:Less than 38 sec.
C:38 sec or higher.

TABLE 1

| | Example | | | Comp. Ex. | | Example | | Comp. Ex. | Example | |
|---|---|---|---|---|---|---|---|---|---|---|
| Coating comp. No. | D-1 | D-2 | D-3 | D-4 | D-5 | S-1 | S-2 | S-3 | DN-1 | SN-1 |
| Acid resistance | A | A | A | C | B | A | A | C | A | A |
| Recoatability | A | A | A | A | B | A | A | B | A | A |
| Impact resistance | 40 | 50 | 45 | 40 | 30 | 45 | 50 | 30 | 55 | 55 |
| Resistance to staining | A | A | A | B | A | A | A | B | A | A |
| Water resistance | A | A | A | B | B | A | A | B | A | A |
| Appearance | A | A | A | A | B | A | A | A | A | A |
| Storage stability | A | A | A | A | C (Gelled) | B | A | A | A | A |
| Solids content of the coating composition (%) | 45 | 46 | 44 | 45 | 45 | 45 | 44 | 45 | 55 | 56 |

B:No change occurred on the surface of the coated panel except that a small difference of level existed on a boundary between the immersed portion and the non-immersed portion.
C:Blushing took place on the coating surface.

Recoatability: Each coating composition was baked at 160° C. for 30 minutes. The same overcoating composition (base coat/clear coat in the case of metallic coating) was applied to the baked piece and the coated piece was further baked at 140° C. for 30 minutes. Thereafter, the coating surface was cut crosswise to form 100 squares, 1 mm × 1 mm. A cellophane adhesive tape was applied to the cut surface and peeled off. The recoatability was evaluated by counting the number of peeled squares.
A:No peeling.
B:A few number of coated squares were peeled.
C:A large number of coated squares were peeled.

Impact resistance: A coated panel was tested for impact resistance with use of a DuPont impact tester with an impact rod having a tip ½ inch in radius and with a dropping weight weighing 500 g. Impact resistance was evaluated in terms of the maximum height at which no cracking was formed on the coating surface on dropping of the weight (with 5-cm intervals).

Resistance to staining: A small quantity of dust (type 15, JIS Z 8901) was sprinkled over the surface of a coated panel and the surface thereof was rubbed with a soft cloth piece (10 strokes), washed with water and air-dried. The surface was wiped with a cloth piece impregnated with ethyl alcohol and was evaluated for a degree of staining.
A:No staining.
B:A slight degree of staining.
C:A considerable degree of staining.

Water resistance: A coated panel was immersed for 240 hours in warm water maintained at 40° C. and

What is claimed is:

1. A coating composition comprising: (a) an acrylic polymer prepared by copolymerizing about 2.5 to about 30% by weight of an alkoxysilane-containing vinyl monomer which is represented by the formula

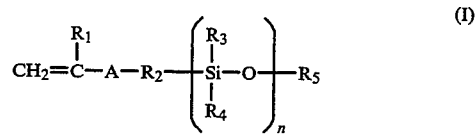

wherein A is

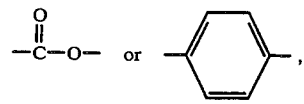

$R_1$ is a hydrogen atom or a methyl group, $R_2$ is a bivalent aliphatic saturated hydrocarbon group having 1 to 6 carbon atoms, $R_3$ and $R_4$ are the same or different and are each a phenyl group, an alkyl group having 1 to 6 carbon atoms or an alkoxy group having 1 to 10 carbon atoms, $R_5$ is an alkyl group having 1 to 10 carbon atoms, and n is an integer of 1 to 100, about 5 to about 50% by weight of an acetoacetoxy-containing vinyl monomer and about 20 to about 92.5% by weight of a vinyl monomer which is copolymerizable with the above vinyl monomers, and (b) an amino resin in an amount of about 5 to about 50% by weight based on the total amount of resin solids in the coating composition.

2. A coating composition according to claim 1 in which the amino resin is at least one member selected from the group consisting of hexamethoxymethyl melamine and an etherified melamine resin having the methoxy groups partially or completely replaced by an alcohol of at least 4 carbon atoms and which further contains an acid neutralized with an amine compound as a curing catalyst.

3. A coating composition according to claim 1 which further contains, as a component (c), a nonaqueous particulate polymer prepared by polymerizing a radical polymerizable unsaturated monomer or monomers in an organic liquid, in which the resulting particulate polymer is insoluble, in the presence of a dispersion stabilizer resin which is a copolymer comprising the alkoxysilane-containing vinyl monomer represented by formula (I) and an acetoacetoxyl-containing vinyl monomer as the essential monomer components.

4. A coating composition according to claim 3 in which the component (c) is used in an amount of about 5 to about 25% by weight based on the total amount of the resin solids in the coating composition.

* * * * *